Aug. 6, 1968     E. J. WALTONEN     3,396,260
FORCE-APPLYING FABRICATING DEVICE
Filed Jan. 21, 1965     2 Sheets-Sheet 1
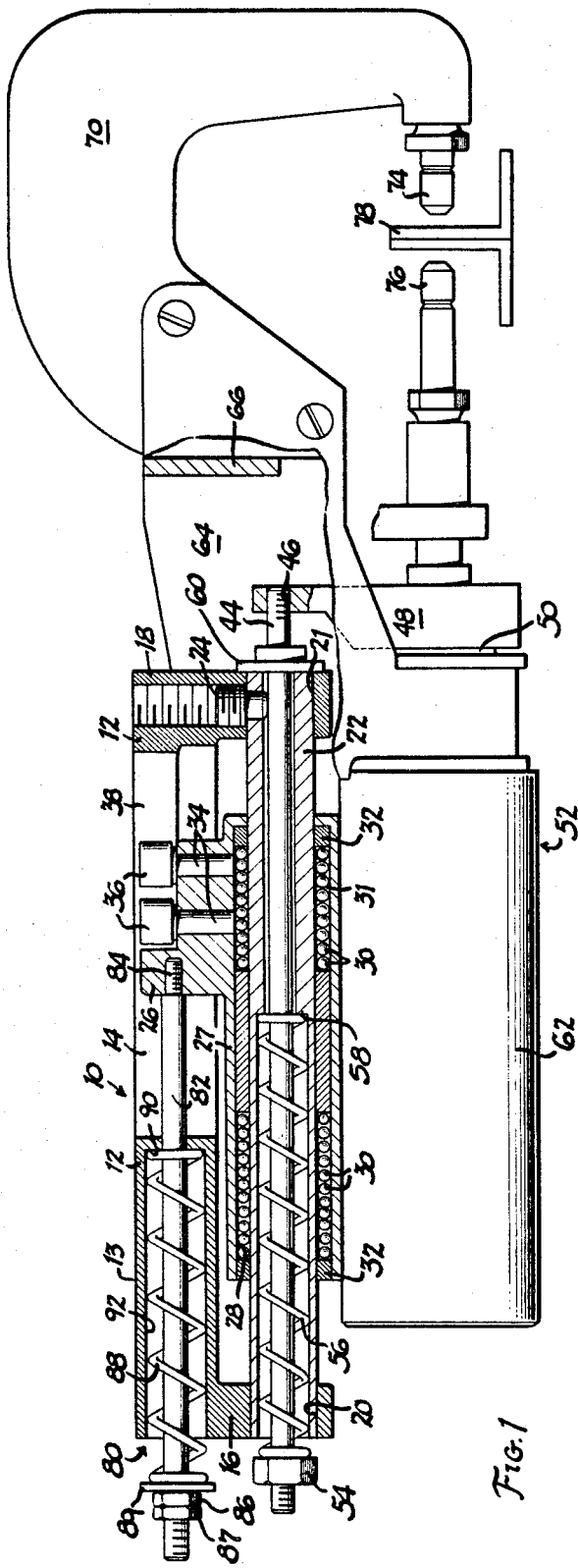
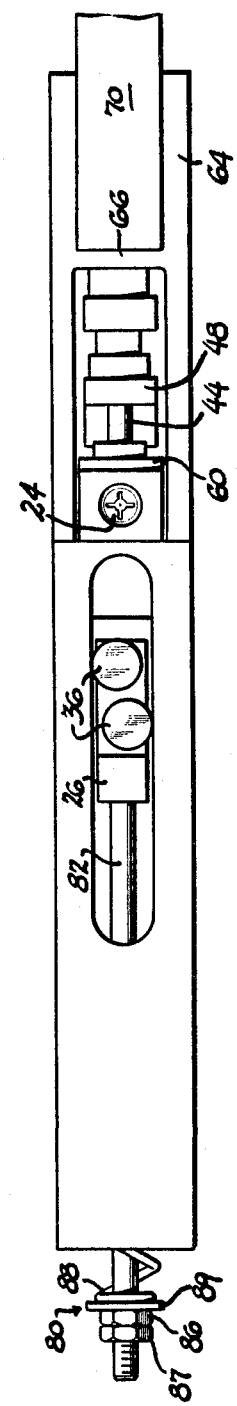
INVENTOR
EDWARD T. WALTONEN
BY
WILSON, SETTLE & CRAIG
ATTORNEYS United States Patent Office 3,396,260
Patented Aug. 6, 1968

3,396,260
FORCE-APPLYING FABRICATING DEVICE
Edward J. Waltonen, Southfield, Mich., assignor to Wes Industries, Inc., Royale Oak, Mich., a corporation of Michigan
Filed Jan. 21, 1965, Ser. No. 426,790
23 Claims. (Cl. 219—89)

ABSTRACT OF THE DISCLOSURE

A self-equalizing fabricating apparatus, such as a resistance welder, which utilizes a fluid motor movably supported by a base for driving two tools into a cushioned engagement with a workpiece. One of the tools is fixed to the piston rod and the other tool is fixed to the cylinder of the motor. The self-equalizing action is effectuated by a connection means fixed to the piston rod and operatively communicating with the base. The connection means is alternatively, a spring bias, a hydraulic chamber with a fluid communication to the fluid motor support, a direct abutment, and a combination of the spring bias and the hydraulic chamber arrangements.

Background of the invention

The present invention relates to improvements in force-applying fabricating apparatus generally used to fabricate various metal parts, as, for example, but not limited to, those parts manufacturable and usable on automobile and like assembly lines. More specifically, this invention relates to novel apparatus for controlling the relative displacements of oppositely disposed workpiece containing tools normally used in conjunction with self-equalizing fabricating apparatus as, for example, apparatus used in welding, riveting, punching, piercing, pressing, stamping and like operations.

Previous commercial force-applying fabricating apparatus of the self-equalizing type has generally been designed to provide a pair of oppositely disposed workpiece contacting fabricating tools such as welding electrodes or piercing die elements. Normally one fabricating tool is attached to the piston rod of a cylinder assembly and the other tool to a yoke mounted upon the cylinder casing of the cylinder assembly. By counterbalancing the movable yoke against the apparatus mounting base, the fabricating device is self-equalized such that the workpiece or work structure will be gently engaged, preferably without distortion, by the tools, whether the tools engage the work structure simultaneously or in staggered timed relation.

In the past, the relative displacements of the fabricating tools toward and away from the work structure was controlled by sharp impact engagement between a stop member appropriately mounted on the piston rod and a second, independent stop member secured to the base of the fabricating apparatus. The second stop member was generally adjustable with respect to the base to preselect the amount of displacement of the piston rod and its associated fabricating tool and, accordingly, the movement of the yoke or carriage and the cylinder casing which carries the other fabricating tool. However, this prior art system of controlling the respective displacements of the fabricating tools has proved deficient in several respects. First, the cost of constructing the base-mounted stop member so as to be adjustable relative to the base has proved to be economically prohibitive to many prospective purchasers, as the total cost of that construction represents a significant portion of the overall cost of the apparatus. Second, the high force of impact exerted by the stop members upon each other during the return stroke of the cylinder assembly has resulted in a repeating recurrence of stop-structure breakage. Consequently high maintenance costs have resulted often making the use of such apparatus prohibitive especially to marginal manufacturers. Third, some work fabricating devices of the type described do not have the inherent construction to precisely maintain the settings of the first and second stop members during continuous, repeated use. Hence, the relative displacements of the work fabricating tools will vary as the stop settings change and will not properly accommodate the configuration of the workpieces being fabricated. This necessitates frequent shutdown for readjustment often requiring specialized technical assistance to accomplish proper resetting.

Summary of the invention

The present invention proposes substantial alleviation of the foregoing prior art deficiencies by providing novel displacement control apparatus for work fabricating tools of the type described which accommodates better performance, especially with respect to continual use, and also increases expected equipment life, at more reasonable cost to thereby meet the diversified, continually changing needs of American industry.

The improved displacement control apparatus is incorporated in a welding gun of the type disclosed in my prior Patent No. 3,136,879 and includes means for controlling the magnitude of displacement of the contacts during their work and return strokes.

Accordingly, it is a primary object of the present invention to provide a novel and versatile line of work fabricating tool displacement control apparatus adaptable to serve the diversified needs of both small and large industrial plants, having one or more of the following features:

(1) Fewer movable parts and, consequently, lower cost to manufacture and less frequent and less costly maintenance;

(2) Optionally available hydraulic, mechanical or combined hydraulic-mechanical tool displacement control structure;

(3) Novel stop mechanism which creates less impact load, smoother aligned operation, and fewer points of stress concentration by interconnection between the piston rod and the base throughout operation;

(4) Pre-settable structure, the setting of which controls the tool displacement during operation for any desired fabricating program and, when once set, the preset displacement for the fabricating program may be repeated an infinite number of times without requirement of any adjustment or reset procedure;

(5) Structure enabling an improved cushioning contact of at least one of the fabricating tools with the work structure preparatory to fabrication thereof, further lessening work structure distortion; and (6) Structure which has the dual capabilities of (a) counterbalancing the approach of the tools to the work structure and (b) controlling the respective displacement of the tools.

These and other objects and features of the present invention will become more fully apparent from the appended claims as the ensuing detail description proceeds in conjunction with the accompanying drawings in which:

In the drawings

FIGURE 1 is a side elevational view, partly in cross section, illustrating one presently preferred embodiment of the present invention;

FIGURE 2 is a plan view of the embodiment of FIGURE 1;

Figure 3:
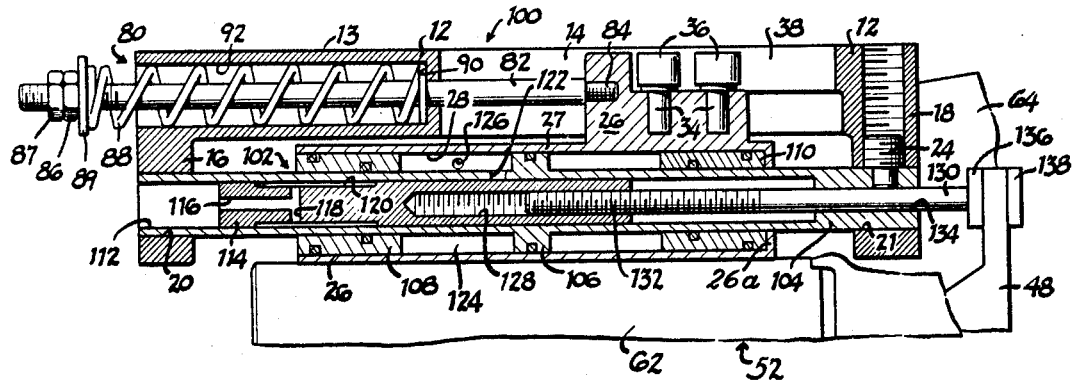
FIGURE 3 is a side elevational view, partly in section similar to FIGURE 1 but illustrating second presently preferred embodiment of this invention.

*The embodiment of FIGURES 1 and 2*

Referring in greater detail to FIGURES 1 and 2 of the drawings, there is shown a force applying fabricating gun in the form of welding gun 10. Welding gun 10 includes a mounting base 12, which is generally U-shaped as viewed in the longitudinal cross section depicted in FIGURE 1. Base 12 is normally provided with suitable openings for attachment to any suitable support, such as a mounting table, along surface 13 of central segment 14. Base 12 further includes a pair of depending arms 16 and 18 provided with aligned apertures 20 and 21, respectively, to receive hollow shaft 22 in non-rotatable, fixed relation. For example, a suitable pin 24 may be provided to lock shaft 22 in its non-rotatable position within apertures 20 and 21 of base 12, so that shaft 22 functions as a rigid support structure upon which reciprocable carriage 26 is displaced back and forth.

Carriage 26 includes a body portion 27 defining a cylindrical bore 28. Suitable anti-friction means such as ball bearings 30, are provided in annular space 31, intermediate bore 28 and hollow shaft 22, to accommodate anti-friction reciprocable movement of carriage 26 back and forth along hollow shaft 22 between working and idle positions. Preferably the bearing construction is precharged with lubricant and sealed at its adjacent ends intermediate bore 28 and shaft 22 as, for example, by seals 32.

In the embodiment of FIGURES 1 and 2, carriage 26 is moved back and forth in rectilinear reciprocating motion without rotation on shaft 22. To this end, carriage 26 is provided with at least one upstanding pin 34 on which is positioned a cam roller 36. However, preferably a pair of upstanding pins 34 are utilized, with a cam roller 36 mounted upon each pin. Each roller operates within an elongated slot 38 extending in a longitudinal direction with respect to base 12. The pair of rollers 36 cooperates with opposite sides of slot 38 during reciprocating movement of carriage 26, so as to prevent the carriage from rotating about its longitudinal axis during such movement. The anti-rotating structure disclosed in my U.S. Patent 3,136,879 may be utilized and reference may be made thereto if desired.

Located within hollow shaft 22 is an elongated rod 44 which is threadedly engaged at end 46 to a suitable fitting or fixture 48, which in turn is non-rotatably mounted upon piston rod 50 of cylinder assembly 52, so that rod 44 always interconnects with the piston rod and moves in unison therewith between the working and idle positions of piston rod 50.

Nut 54 threadedly engages the opposite end of the rod 44 and acts as an abutment stop for one end of compression spring 56, which is concentrically disposed about the rod 44. The other end of compression spring 56 is biased against shoulder 58 of hollow shaft 22. Therefore, as piston rod 50 is extended toward its working position, unitarily displacing rod 44 an equal distance in the illustrated offset relation, compression spring 56 is further compressed an amount predeterminable according to the location of nut 54 upon rod 44 to thereby accommodate a more gentle approach and contact between the workpiece fabricating tools, such as welding electrodes, and the workpiece to be fabricated.

Annular stop ring 60 circumscribes rod 44 adjacent threaded end 46 and may be welded or otherwise fastened to base 12 or, alternatively, may merely rest upon rod 44 in slidable relation thereto. Stop ring 60 may have any desired projecting dimension extending in a direction parallel to the longitudinal axis of rod 44 to thereby control or regulate the amount of displacement of cylinder casing 62 and of piston rod 50 during their return stroke. This controls not only retraction of piston rod 50 and casing 62, but also controls the displacement of carriage 26, which moves integral with cylinder casing 62 in a direction opposed to the retracting movement of the piston rod.

The present invention comprehends provision of a plurality of stops 60 having varying projecting lengths for manipulating the respective displacements of the cylinder casing and the piston rod, along with the welding electrodes which these members carry, to correspond to any preselected one of a plurality of work fabricating programs.

It should be noted that base 12 has an external configuration to accommodate free reciprocating movement of bifurcated arms 64 which form an integral part of carriage 26. Arm portions 64 of carriage 26 extend on both sides of base arm 18, in spaced relation during all phases of operation, with arm 18 being located in a hollow space between the arm portions. The carriage arm portions 64 again become integral at their distal ends 66. Connector portion 66 carries welding head 70 in insulated relation to which is attached a work fabricating tool, in this instance, electrode 74. Electrode 74 is oppositely disposed toward electrode 76, which is carried by and movable with piston rod 50 to engage oppositely disposed faces of a workpiece 78.

Double-acting fluid cylinder assembly 52 is attached to carriage 26 for unitary movement therewith in any conventional manner, as, for example, by threaded connection.

Carriage 26 may be counterbalanced by spring assembly 80 which includes a rod 82 threadedly connected at 84 to carriage 26 and is threaded at the opposite end to receive nut 86 and lock nut 87 to bias compression spring 88 between washer 89 and surface 90 within bore 92 of base 12 in concentric relation about rod 82. One or more of these compression spring assemblies or one or more compression springs concentrically positioned about each other and the rod may be used to achieve the desired magnitude of counterbalance preload exerted by the spring assembly upon carriage 26 in a well known manner.

However, it is to be appreciated that the spring assembly which includes compression spring 56 and which is concentric of rod 44 may be selected and adjusted to exert the requisite biasing force to draw the carriage and cylinder assembly into the requisite preloaded position. Under such circumstances, the spring assembly of which compression spring 56 forms a part constitutes a combined counterbalance and tool displacement control apparatus for novelly prepositioning the carriage and cylinder casing and for controlling the respective displacements of the cylinder casing and the piston rod along with their associated electrodes 74 and 76, respectively, during the working and return strokes, which generates small inertia forces and creates only nominal frictional forces during all phases of operation.

In operation of welding gun 10, after the workpiece 78 has been appropriately positioned between oppositely disposed electrodes 74 and 76, as illustrated in FIGURE 1, fluid under pressure is introduced into the left-hand end of cylinder casing 62. This causes movement of the cylinder casing 62 and carriage 26 toward the left responsive to fluid pressure and to the counterbalance force exerted upon carriage 26 by spring assembly 80 and also causes piston rod 50 to move toward the right relative to the cylinder casing 62, either simultaneously or in staggered timed relation. Such cylinder casing and piston rod displacement causes electrodes 74 and 76 to approach workpiece 78, to engage oppositely disposed sides thereof and thereafter resistance weld the workpiece into an integral unit.

The rightward displacement of piston rod 50, prior to electrode workpiece engagement, unitarily displaces rod 44 toward the right, by reason of its fixed attachment to the piston rod through fixture 48, incrementally further compressing compression spring 56. Compression spring 56 is urged by abutment nut 54 into a state of increased compression during the advancing stroke of piston rod 50 in essentially a direction opposite to the direction of advancement. This tends to gentle the approach of electrode 76 progressively as it advances nearer to workpiece 78 to thereby further avoid distortion of the workpiece prior to and during the resistance welding operation.

After the welding operation has been completed, fluid under pressure is fed into the right end of cylinder casing 62 and simultaneously exhausted from the left end of cylinder 62 to return welding gun 10 to its idle or at-rest position preparatory for another welding cycle. Compression spring 56 aids in urging piston rod 50 toward its retracted position during the return stroke which brings fitting 48 into contact with the rightmost surface of stop 60, as viewed in FIGURE 1. The co-action between compression spring 56 and its associated structure uniquely prevents bowing in either rod 44 or hollow shaft 22 to thereby obviate binding during relative movement between these structural components as well as fatigue failure.

Furthermore, during relative movement of the electrodes and their associated actuating structure toward and away from the workpiece, there is at no time any significantly high pressure exerted upon the workpiece, even when one electrode engages the workpiece in advance of the other electrode. Hence, workpiece deformation is obviated. This is particularly significant when the workpiece being welded is a very thin metal structure, since bending or deformation thereof would cause permanent malformation of the workpiece and make it unacceptable for subsequent final installation. This feature of low electrode workpiece engagement prior to resistance welding resulting in an absence of deformation of the workpiece is broadly characterized as self-equalization.

The embodiment of FIGURE 3

Referring now to the second presently preferred embodiment of this invention as depicted in FIGURE 3, there is shown a force-applying fabricating gun 100 in the form of a resistance welding gun which is identical in certain respects to resistance welding gun 10 of FIGURES 1 and 2, earlier described. The base, carriage, cylinder assembly, and counterbalanced spring assembly are illustrated as being identical with the corresponding structure of resistance welding gun 10, and, accordingly, no further description thereof is deemed necessary nor undertaken.

In this embodiment, however, a hydraulic device, generally denominated as numeral 102, is provided for controlling the relative displacements of the oppositely disposed welding electrodes carried by piston rod 50 and cylinder casing 62, respectively. In this instance, carriage 26 is supported for its reciprocating movement by hollow shaft 104. A central, radially projecting annulus 106, appropriately fitted with an O-ring, centrally supports carriage 26 by contact with internal bore 28. Similarly, annular inserts 108 and 110, also equipped appropriately with O-rings, are interposed in the space between the surface of bore 28 of carriage 26 and the external surface of hollow shaft 104 to permit frictional movement of the carriage back and forth along the shaft. As clearly shown in FIGURE 3, the insert 110 engages an integral end portion 26a of the carriage 26 while insert 108 is releasably secured to carriage 26 by means (not shown).

Hollow shaft 104 includes internal bore 112 into which hydraulic spool 114 is closely fitted for reciprocating movement therein responsive to actuation of cylinder assembly 52. Hydraulic spool 114 is equipped with an inlet passage 116, radial side ports 118, and an annular chamber 120 for hydraulic fluid communication in the manner and for purposes which will become subsequently apparent as the description proceeds. Hollow shaft 104 has radial port 122 to selectively permit ingress of hydraulic fluid under pressure from annular chamber 120 into annular chamber 124 where there is registry therebetween. Intermediate bore surface 28 of carriage 26, the external surface of hollow shaft 104, the right surface of annular sleeve 108 and the lefthand surface of annular projection 106 define annular chamber 124. Hydraulic pressure in chamber 124 urges carriage 26 along with cylinder casing 62 leftward, as viewed in FIGURE 3, in preselected timed relation with the welding cycle as will subsequently become apparent. On the return stroke, hydraulic fluid trapped in annular chamber 124 is exhausted through port 126 in carriage 26.

Hydraulic spool 114 is also equipped with a threaded bore 128 into which a shaft or rod 130 is secured at threaded end 132 thereof. Rod 130 passes through aperture 134 in hollow shaft 104 which accommodates relative frictional movement of rod 130. Shaft 130 is rigidly fixed to bushing 136 and has a head 138 thereon for turning shaft 130 causing end 132 to thread or unthread in bore 128 of hydraulic spool 114. The relative engagement of end 132 with bore 128 controls the magnitude of displacement to be occasioned by cylinder casing 62 and its associated electrode and by piston rod 50 and its associated electrode, respectively, during their working and return strokes.

In operation, resistance welding gun 100 functions similar to welding gun 10. Following proper placement of workpiece 78 between electrodes 74 and 76, fluid under pressure is introduced into the lefthand end of cylinder casing 62 moving casing 62 and its electrode 74 toward the left and piston rod 50 and its electrode 76 towards the right, either unitarily or in sequential timed relation, the electrodes to gently engage the workpiece 78 and to thereafter resistance weld the workpiece into an integral unit.

Following actuation of cylinder assembly 52, and simultaneously with or subsequent to rightward advancement of piston rod 50, counterbalance spring assembly 80 aids the fluid pressure to displace carriage 26 and cylinder casing 62 toward the left drawing electrode 74 toward the workpiece. After a given distance of displacement by piston rod 50, which draws displacement control rod 130 along with hydraulic spool 114 toward the right, as viewed in FIGURE 3, at which time hydraulic fluid under pressure is supplied by conventional means (not shown) to passage 116, radial bore 118 and annular chamber 120, the righthand edge of annular chamber 120 is brought into fluid communication with inlet port 122 and annular chamber 124. Pressure in chamber 124 is exerted upon the exposed face of annular projection 106 of hollow shaft 104 and the exposed face of annular sleeve seal 108. Inasmuch as shaft 104 is stationary, the pressure exerted upon the exposed face of annular seal 108 further displaces carriage 26 and cylinder casing 62 toward the left. By the foregoing procedure, electrodes 74 and 76 are brought into contact with workpiece 78 following which pressure sufficient to resistance weld the workpiece into an integral unit is exerted by the electrodes while the electrodes are appropriately electrically charged. After the welding operation has been completed, fluid pressure is introduced into the righthand end of cylinder casing 62, while fluid in the lefthand end is exhausted to allow resistance welding gun 100 to return to its initial at-rest, idle position preparatory for another welding cycle. During the return stroke, fluid trapped within annular chamber 124 is exhausted through egress port 126.

Hydraulic fluid present in annular chamber 120, radial port 118, passage 116 and bore 112 of hollow shaft 104 to the left of hydraulic spool 114 may be either (1) exhausted, or (2) may exert a desired pressure force against hydraulic spool 114 to cushion the return stroke of the piston rod 50 and, if desired, to stop the return stroke of piston rod 50 at any predetermined location following which or simultaneously with which cylinder casing 62 will be oppositely advanced to join piston rod 50 in the fully retracted orientation.

It is to be noted that just as in the case of welding gun 10, welding gun 100 may be equipped without utilization of counterbalance spring assembly 80, whereupon hydraulic pressure exerted annular chamber 124 will be the sole force urging carriage 26 and cylinder casing 62 through its leftward travel to draw electrode 74 into contact with the workpiece. In such circumstances, hydraulic device 102 would function to both counterbalance welding gun 100 and to control the respective replacements of cylinder casing 62 and piston rod 50.

Figure 4:
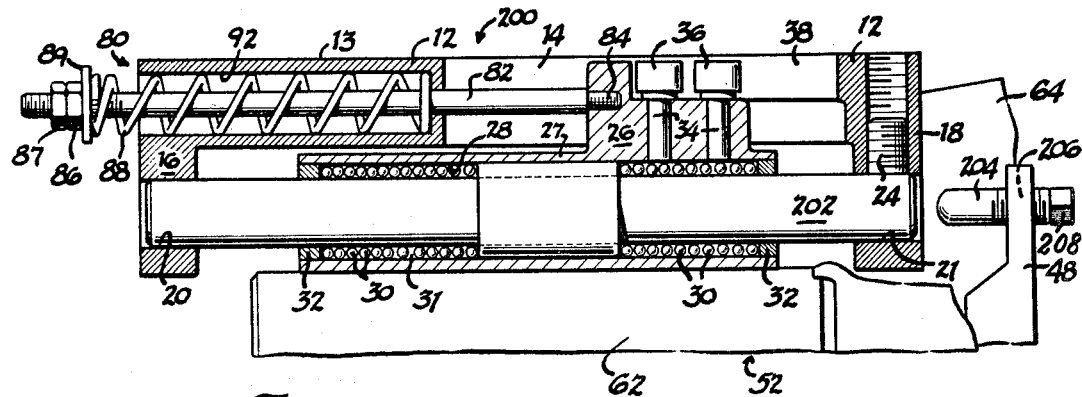
FIGURE 4 is a side elevational view, partly in section, illustrating a third preferred embodiment of this invention.

The embodiment of FIGURE 4

Referring now to the third presently preferred embodiment of this invention as illustrated in FIGURE 4, there is shown resistance welding gun 200, which is identical in certain basic respects to the welding gun 10 previously described. The base, the carriage, the cylinder assembly, the counterbalance spring assembly, the ball bearing supports and the electrodes supporting arrangement are all identical to that shown and described in conjunction with gun 10. Accordingly, no further description of these components is deemed necessary nor undertaken.

In this embodiment, however, a solid shaft 202 is held in rigid non-rotatable position in base apertures 20 and 21 by, for example, a suitable pin 24 which locks the shaft in that position. Carriage 26 moves to and fro in rectilinear reciprocating movement along the external surface shaft 202 in a manner similar to the movement of the carriage upon hollow shaft 22 of resistance welding gun 10 earlier described. The cylinder assembly 52 is also similarly actuated to accommodate the working and return strokes of cylinder casing 62 and piston rod 50.

In this instance, however, the relative displacements of the cylinder casing and the piston rod with their associated electrodes during both the working and return strokes is controlled by rod 204 which extends in parallel offset relation to piston rod 50 and is either adjustably or removably secured in aperture 206 of piston rod fitting 48. If the interconnection between rod 204 and fitting 48 is to be adjustable, preferably threaded connections therebetween are provided along the righthand end of rod 204 and in aperture 206. Thus, by merely rotating shaft 204 as, for example, with a wrench applied to head 208, the distance which rod 204 extends toward base 12 may be varied and, accordingly, the displacement during operation of cylinder casing 62 and piston rod 50 will be proportionately changed. If rod 204 is releasably attached in aperture 206 of fitting 48, then, preferably, aperture 206 is equipped with a spring biased detent assembly and rod 204 with a socket to receive the detent for securely holding rod 204 in fixed relation with respect to fitting 48 during welding operation, but permitting handy removal of rod 204 and replacement thereof by another similar rod of different axial length, thereby varying the distance which the rod extends from fitting 48 toward base 12 and, accordingly, varying the respective displacements of cylinder casing 62 and piston rod 50 during welding operation. Otherwise, welding gun 200 functions during the welding operation in the manner similar to welding gun 10, depicted in FIGURES 1 and 2, with the right end of rod 204 engaging the adjacent face of base 12 to control the respective displacements of the cylinder casing and the piston rod.

Figure 5:
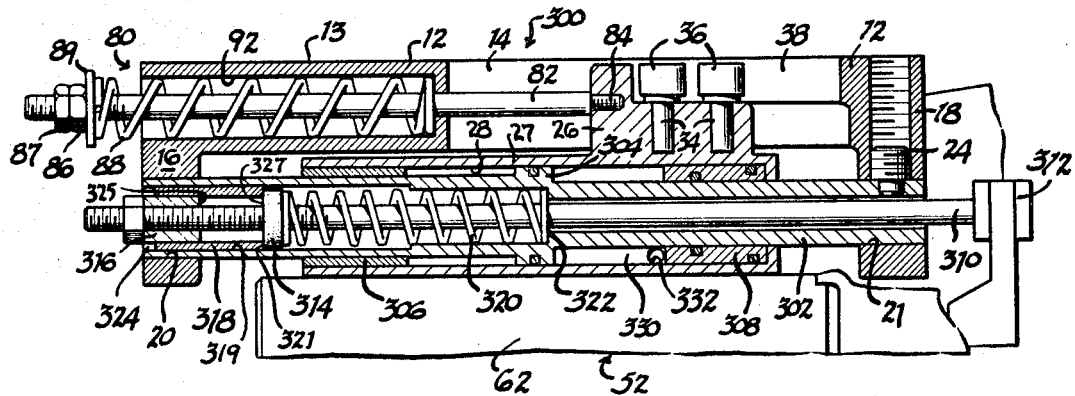
FIGURE 5 is a side elevational view, partly in cross section, illustrating a fourth presently preferred embodiment of this invention.

The embodiment of FIGURE 5

Referring now to the fourth presently preferred embodiment of the present invention illustrating resistance welding gun 300 which combines same features of both welding gun 10, depicted in FIGURES 1 and 2, and welding gun 100, depicted in FIGURE 3, the base, the carriage, the cylinder assembly, the counterbalance spring assembly, and the displacement controlling rod are all substantially identical to the comparable components of welding gun 10 previously described. The hollow shaft construction includes features of both hollow shaft 22 of welding gun 10 and hollow shaft 104 of welding gun 100. Structural components which identically correspond to structural parts previously explained in the foregoing embodiments will not be here described, since this would merely be duplication. The following description therefore concerns itself primarily with the structural differences or variations present in welding gun 300 with respect to the previously described embodiments of this invention.

Hollow shaft 302 is carried by depending arms 16 and 18 in apertures 20 and 21, respectively, in fixed non-rotatable relation by set screw 24. Annular projection 304 of hollow shaft 302 centrally engages the surface of bore 28 of carriage 26 accommodating reciprocating movement. Annular projection 304 appropriately contains O-ring sealing structure. Annular ring 306 is interposed between the lefthand end of carriage 26 and the external surface of the lefthand portion of hollow shaft 302, as viewed in FIGURE 5. Annular seal sleeve 308, appropriately fitted with O-ring sealing structure is interposed between the righthand surface of bore 28 and the external surface along the righthand end of hollow shaft 302 to thereby accommodate smooth, aligned, reciprocal movement of the carriage back and forth across hollow shaft 302. Displacement controlling rod 310 is secured internal of hollow shaft 302 for rectilinear reciprocating movement unitary with and responsive to the extension and retraction of piston rod 50. The righthand end of rod 310 is secured in flanged bushing 312 in any desired fixed manner, while the lefthand end of rod 310 is threaded to receive abutment nut 316. Nut 316 is slip-fit in hollow spring adjustment screw 318 to accommodate relative movement therebetween.

Adjustment screw 318 threadedly engages the interior of hollow shaft 302 at juncture 319. The right end 321, as viewed in FIGURE 5, of screw 318 abuts collar 314, which acts as a bearing against which one end of compression spring 320 is urged. Collar 314 is slip-fit over rod 310 to accommodate relative movement. The other end of compression spring 320 abuts in compressive relation against shoulder 322 of hollow shaft 302. Thus, the position of collar 314 may be varied by screwing adjustment screw 318 in or out of hollow shaft 302. Screw 318 may be turned as, for example, by means of notches 324 in the exposed left end face of the sleeve screw 318. This adjusts the relative amount of precompression exerted by compression spring 320, which precompression functions to not only return the piston rod 50 and its electrode 76, but more importantly, compensates for irregular tip wear at the two electrodes. Hence, even when one electrode wears more than the other, the equalizing, force applying characteristics of the gun will not be affected.

Adjustment nut 316 is adjusted on rod 310 so that the space between the right end face 325 of nut 316 and the left end face 327 of collar 314 is set to a predetermined distance to suit the shape of the workpiece to be fabricated. This regulates the magnitude and timing of displacement of the electrodes once the distance between faces 325 and 327 is set. Operation of gun 300, by actuation of cylinder 52, will cause piston rod 50, along with electrode 76, to be displaced toward the right a distance equal to the distance between faces 325 and 327 while the carriage 26, yoke 70 and electrode 74 remain idle. This displacement will bring face 325 of nut 316 into engagement with face 327 of collar 314. Thereafter, electrodes 74 and 76 move jointly toward and into fabricating engagement with the workpiece.

Thus, when the configuration of the workpiece, for purpose of ingress and egress clearance requires that electrode 76 be spaced from the workpiece surface to be fabricated a distance, say 1 inch greater than the spacing of electrode 74, the distance between faces 325 and 327 will be set for 1 inch. After faces 325 and 327 come together, further displacement of piston rod 50 and electrode 76 toward the right during the working stroke of welding gun 300 further compresses compression spring 320 and gentles its approach and contact with workpiece 78.

An annular chamber 330 is formed intermediate bore surface 28, the external surface of hollow shaft 302, the righthand surface of annular projection 304, and the lefthand face of annular seal 308. Hydraulic fluid under pressure enters and leaves through side port 332, situated in the side wall of carriage 26. Procedurally, hydraulic fluid under pressure is introduced through port 332 during the return stroke of cylinder assembly 52, the amount of fluid introduced into annular chamber 330 controlling the magnitude of return displacement of carriage 26 along with its integrally connected cylinder casing 62 toward the right, thereby determining the distance which electrode 74 will move away from workpiece 78 during the return stroke of cylinder assembly 52. As the volume of hydraulic fluid introduced into annular chamber 330 is varied, the permissible displacement of carriage 26 and electrode 74 is also proportionally changed. Pre-evacuation of chamber 330, before actuation of cylinder 52 to extend piston rod 50, will accommodate initial displacement of electrode 74 an amount proportional to the fluid pre-evacuated due to the force of spring 88. Thus, where workpiece configuration requires it, electrode 74 may be displaced a greater distance than electrode 76.

Again, counterbalance spring assembly 80 may be eliminated from the embodiment depicted in FIGURE 5 and the hydraulic mechanism of which annular chamber 330 forms a part may then function as both a counterbalance and an electrode displacement control device.

In operation, assuming workpiece 78 to be appropriately positioned midway between open electrodes 74 and 76 and faces 325 and 327 to be in contact, fluid under pressure is introduced into the lefthand end of cylinder casing 62 thereby moving piston rod 50 along with electrode 76 toward the right and cylinder casing 62 along with electrode 74 toward the left, simultaneously as the hydraulic fluid contained within annular chamber 330 is exhausted through port 332. As piston rod 50 advances toward the workpiece 78, displacement control rod 310 moves unitarily therewith in offset relation. (Staggered displacement of the electrodes for different distances may be provided by providing a space of desired distance between faces 325 and 327 and by controlling the time at which fluid is exhausted from chamber 330, as previously described.) Collar 314, response to displacement of rod 310, functions during such movement to further compress compression spring 320 allowing for a more gentle approach of electrode 76 toward and into contact with the workpiece 78.

Following the welding operation, fluid in the lefthand end of cylinder casing 62 is exhausted while fluid under pressure is introduced into the righthand end of cylinder casing 62 to displace piston rod 50 along with electrode 76 toward the left away from the work, and cylinder casing 62 along with electrode 74 toward the right away from the workpiece 78 in unitary movement. During the retraction stroke, a predetermined volume of fluid under pressure is introduced through port 332 into annular pressure chamber 330 to displace carriage 26 and its unitarily attached cylinder casing 62 toward the right only a distance proportional to the volume of fluid introduced into the chamber. Hence, the displacements of both cylinder casing 62 and piston rod 50 are controlled, since the distance which cylinder casing 62 is displaced toward the right by reason of the predetermined volume of fluid introduced into annular chamber 330 substracts from the amount of potential displacement in a leftward direction which piston rod 50 may traverse during its return stroke.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a work fabricating device the combination comprising a mounting base, a carriage, means mounting the carriage for reciprocal movement in a longitudinal direction, said carriage comprising an elongated body portion located adjacent the base, two generally parallel arm portions extending longitudinally from the body portion, and a wall structure connecting the ends of the arm portions remote from the body portion, a first work fabricating tool carried by the connecting wall structure, a second work fabricating tool extending toward the first work fabricating tool so that each tool may engage one face of a work structure, at least one fluid cylinder secured to the body portion of the carriage, a piston rod extending from the fluid cylinder to move the second work fabricating tool, counterbalanced means biased between the base and the carriage arranged so that the cylinder is effective to cause the carriage and the piston rod to draw the first and second work fabricating tools against the work and to then apply a substantial fabricating force through the tools upon the work, and tool displacement control means continuously interconnecting said piston rod and said base during all phases of the return and work strokes of the work fabricating tools to thereby gently regulate the respective displacements of each of the tools.

2. A device as defined in claim 1 wherein said tool displacement control means includes a fitting attached to the piston rod and an elongated rod attached to the fitting and slidably attached to the base and means for stopping the return movement of the piston rod at a predetermined position.

3. In a base-supported, self-equalizing work fabricating device having a base, two oppositely disposed work fabricating tools arranged to engage opposite faces of a work structure, a floatably mounted carriage connected with one of the tools for moving same toward and away from the work structure, reciprocable power means including a first part carried by the carriage and a second part supporting the other of said tools, the improvement comprising tool displacement control apparatus including rod means continuously interconnecting the second part of the reciprocable power means to the base during all phases of operation, said rod means extending substantially parallel to and being offset from the reciprocable power means and slidably interconnected to the base, and means operable intermediate the base and the rod means to urge the second part of the reciprocable power means toward its idle position.

4. A device as defined in claim 3, in which said base includes a hollow shaft and wherein said carriage is supported for floating reciprocable movement upon said hollow shaft and wherein said last means is a compression spring interposed within the hollow shaft between one surface of the hollow shaft and one surface of the rod means, said compression spring urging said second part of the reciprocable power means toward its idle position with a force proportional to the magnitude of movement of the rod means relative to the base.

5. A device as defined in claim 3 wherein said rod means are connected to said second part of the reciprocable power means by a fitting fixed upon said second part and further including removable stop means interposed between the fitting and the base adjacent the rod means for restricting the return movement of said part to thereby limit the amount of displacement of the tools during their working and return strokes.

6. A base-supported, self-equalizing work fabricating device comprising, a base including a hollow shaft, two oppositely disposed work fabricating tools arranged to engage the opposite faces of a work structure, a shaft-mounted floatable carriage connected with one of said tools for moving same toward and away from the work structure, reciprocable power means including a cylinder carried by the carriage and piston rod supporting the other of said tools, counterbalance means acting on said carriage so that the tools engage the work structure with a relatively low engagement force, tool displacement control apparatus including a rod continuously interconnecting the piston rod to the base during all phases of operation, said rod being offset from and extending parallel to the axis of the piston rod, a fixture carried upon the piston rod and connected to said rod, said rod being slidably interconnected to the base through the hollow shaft, a compression spring interposed within the hollow shaft between one surface of the hollow shaft and one surface of the rod, said compression spring urging said piston rod toward its retracted position with a force proportional to the magnitude of movement of the rod relative to the base, an annular stop washer removably interposed between the fixture and the base about the rod for restricting the return movement of the piston rod to thereby limit the amount of displacement of both the tools during their working and return strokes.

7. In a base-supported, self-equalizing work fabricating device having two oppositely disposed work fabricating tools arranged to engage opposite faces of the work structure, a floatably mounted carriage connected with one of the tools for moving the same toward and away from the work structure, reciprocable power means including a piston rod connected between the carriage and the other tool, the improvement comprising tool displacement control apparatus including means continuously interconnecting the piston rod to the base during all phases of operation, said interconnecting means comprising rod means and hydraulically responsive means adjustably connected to the rod means for controlling the respective magnitudes of displacement of the tools during their working and return strokes.

8. A device as defined in claim 7 wherein said carriage is supported for floating reciprocable movement upon a hollow shaft which constitutes part of the base, said hollow shaft cooperating with the carriage to form a hydraulic pressure chamber, and wherein said hydraulically responsive means includes a hydraulic spool which accommodates introduction of fluid under pressure into said pressure chamber following a predetermined amount of displacement of the piston rod toward the work structure to urge the carriage and said one tool toward the work structure.

9. In a base-supported, self-equalizing work fabricating device having two oppositely disposed work fabricating tools arranged to engage opposite faces of a work structure, a shaft supporting a floatable carriage connected with one of the tools for moving same toward and away from the work structure, said shaft being hollow and forming part of the base, reciprocable power means connected between the carriage and the other tool, counter-balancing means acting on said carriage so that the tools engage the work structure with a relatively low engagement force, said hollow shaft cooperating with the carriage to form a hydraulic pressure chamber, tool displacement control apparatus including seriatim a fitting, a rod, and a hydraulic spool interconnecting the piston rod to the base during all phases of operation, said rod being threadedly connected to the hydraulic spool for combined reciprocating movement within the hollow shaft responsive to the reciprocating movement of the piston rod, said hydraulic spool accommodating introduction of fluid under pressure into the pressure chamber following a predetermined amount of displacement of the piston rod toward the work structure to urge the carriage and said one tool toward the work.

10. In a base-supported, self-equalizing work fabricating device having two oppositely disposed work fabricating tools arranged to engage opposite faces of a work structure, a floatably mounted carriage connected with one of the tools for moving same toward and away from the work structure, reciprocable power means including a reciprocable rod connected between the carriage and the other tool and combined counterbalancing and tool displacement control means including hydraulic means biasing the reciprocable rod for a predetermined magnitude of displacement during the return stroke and biasing the carriage and said one tool toward the work structure during the working stroke, and elongated means interconnecting the rod and the base during all phases of operation and being movable relative to the base.

11. In a base-supported, self-equalizing work fabricating device having two oppositely disposed work fabricating tools arranged to engage opposite faces of a work structure, a floatably mounted carriage connected with one of the tools for moving same toward and away from the work structure, reciprocable power means connected between the carriage and the other tool, and tool displacement control apparatus including means continuously interconnecting part of the reciprocable power means to the base during all phases of operation, mechanical means cooperating with the interconnecting means to urge said one tool away from the work structure during at least one preselected interval of the operation and hydraulic means for urging said other tool away from the work structure during at least one preselected interval of operation.

12. In a base-supported, self-equalizing work fabricating device having two oppositely disposed work fabricating tools arranged to engage opposite faces of a work structure, a floatably mounted carriage connected with one of the tools for moving same toward and away from the work structure, reciprocable power means connected between the carriage and the other tool, and tool displacement control apparatus including means continuously interconnecting the reciprocable power means to the base during all phases of operation but accommodating relative movement of said interconnecting means with respect to the base during operation, mechanical means cooperating with the interconnecting means to urge said one tool to be displaced with respect to the work structure during at least one preselected interval of the operation and hydraulic means for urging said other tool toward displacement with respect to the work structure during at least one preselected interval of operation, said mechanical means including regulating means enabling displacement of said one tool a predetermined distance while said other tool remains stationary.

13. In a self-equalizing work fabricating device having a base, a reciprocably floating counter-balanced carriage supported on said base, a cylinder assembly including a cylinder supported on said carriage and a piston rod movable relative to said cylinder, a first work fabricating tool mounted on said carriage and a second work fabricating tool mounted on said piston rod, the improvement comprising an elongated stop rod fixed to the piston rod and extending in spaced parallel relation thereto, said stop rod projecting a predetermined distance towards said base for direct contact with said base during the return stroke of the work fabricating tools to thereby regulate the magnitude of the respective displacement of each of said tools during their work and return stroke to correspond with a pre-selected work fabricating program.

14. The improvement as defined in claim 13 wherein said stop rod is indirectly fixed to said piston rod through a fitting with means adjustably securing said stop rod to said fitting.

15. In a self-equalizing work fabricating device including a base, a carriage reciprocably carried by said base, a first work contact connected to and movable with said carriage, a cylinder assembly having a cylinder connected to said base and a piston rod movable relative to said cylinder, and a second work contact carried by said piston rod, the improvement of displacement regulating means comprising rod means spaced from and parallel to said piston rod, said rod means being connected to said piston rod for movement therewith, and control means interposed between said rod means and said base for regulating the magnitude of the respective displacements of each of said contacts during the work and return stroke of the piston rod.

16. A self-equalizing work fabricating device as defined in claim 15, in which said control means includes means supported on said rod means, and a compression spring having one end in engagement with said base, the opposite end in engagement with said last means for urging said piston rod towards its retracted position.

17. A self-equalizing work fabricating structure as defined in claim 16, in which said last means includes a collar slidable on said rod means, and mechanical means cooperating with said collar and said rod means enabling displacement of one of said contacts a predetermined distance while the other of said contacts remains stationary.

18. A self-equalizing work fabricating device as defined in claim 15, the further improvement of said base including a hollow shaft and said rod means is slidably received in said hollow shaft, said control means comprising a member supported on said rod means and a spring interposed between a surface of the hollow shaft and said collar.

19. A self-equalizing work fabricating device as defined in claim 15, in which said control means further includes adjustable means enabling displacement of one of said contacts a predetermined distance while the other of said contact remains stationary and thereafter enabling simultaneous displacement of both contacts into fabricating engagement with a workpiece.

20. A self-equalizing work fabricating device as defined in claim 19, in which said control means further includes hydraulic means for urging the other of said contacts for relative displacement with the workpiece during at least a portion of the operation.

21. A self-equalizing work fabricating device as defined in claim 20, in which said hydraulic means includes a pressure chamber between said base and said carriage whereby introduction of fluid into said chamber will displace said carriage relative to said base.

22. A self-equalizing work fabricating device as defined in claim 15, in which said base includes a hollow shaft with said rod means slidable in said shaft and said control means includes hydraulic means interposed between said shaft and said rod means.

23. A self-equalizing work fabricating device as defined in claim 22, in which said hydraulic means includes a hollow pressure chamber defined between said shaft and said carriage and a hydraulic spool which accommodates introduction of fluid under pressure into said chamber following a predetermined amount of relative displacement of said piston rod and cylinder thereby urging said contact connected to said carriage toward the workpiece.

References Cited
UNITED STATES PATENTS

| | | | |
|---|---|---|---|
| 2,372,413 | 3/1945 | Weightman | 219—89 |
| 2,879,373 | 3/1959 | Fagge | 219—89 |
| 2,952,765 | 9/1960 | Droste | 219—89 |
| 3,008,032 | 11/1961 | Wolfbauer | 219—89 |
| 3,136,879 | 6/1964 | Waltonen | 219—89 |

RICHARD M. WOOD, *Primary Examiner.*

J. G. SMITH, *Assistant Examiner.*

UNITED STATES PATENT OFFICE
CERTIFICATE OF CORRECTION

Patent No. 3,396,260                            August 6, 1968

Edward J. Waltonen

It is certified that error appears in the above identified patent and that said Letters Patent are hereby corrected as shown below:

Column 1, line 33, "containing" should read -- contacting --. Column 2, line 61, "detail" should read -- detailed --; line 71, after "illustrating" insert -- a --. Column 6, line 32, after "relation," insert -- causing --. Column 7, line 4, after "exerted" insert -- on --; line 10, "replacements" should read -- placements --.

Signed and sealed this 17th day of February 1970.

(SEAL)
Attest:

Edward M. Fletcher, Jr.                       WILLIAM E. SCHUYLER, JR.
Attesting Officer                               Commissioner of Patents